United States Patent [19]

De Fouw et al.

[11] 4,197,952
[45] Apr. 15, 1980

[54] STORAGE UNIT AND POST AND BEAM OF THE UNIT

[75] Inventors: Eugene A. De Fouw, Portage; Thomas A. Klein, Plainwell; William A. Rhodes, Kalamazoo, all of Mich.

[73] Assignee: Lear Siegler, Inc., Kalamazoo, Mich.

[21] Appl. No.: 907,085

[22] Filed: May 18, 1978

[51] Int. Cl.² .............................................. A47F 5/10
[52] U.S. Cl. .................................. 211/191; 211/208; 403/231; 403/263
[58] Field of Search ............... 211/191, 187, 207, 208; 108/111, 106, 107, 153; 403/353, 231, 263, 403

[56] References Cited

U.S. PATENT DOCUMENTS

| | | | |
|---|---|---|---|
| 1,554,011 | 9/1925 | Lehman | 211/187 X |
| 2,937,767 | 5/1960 | Butler et al. | 211/187 X |
| 3,095,975 | 7/1963 | Cassel et al. | 211/192 |
| 3,195,735 | 7/1965 | Jay | 211/191 X |
| 3,294,043 | 12/1966 | Joyce | 108/111 |
| 3,592,345 | 7/1971 | Featherman | 211/191 |
| 3,733,755 | 5/1973 | Butler | 211/191 X |
| 3,788,490 | 1/1974 | Featherman | 211/191 |
| 4,064,996 | 12/1977 | Shillum | 211/191 |
| 4,074,812 | 2/1978 | Skubic et al. | 211/208 X |

FOREIGN PATENT DOCUMENTS

| | | | |
|---|---|---|---|
| 1414064 | 9/1965 | France | 211/191 |
| 1123315 | 8/1968 | United Kingdom | 211/192 |

Primary Examiner—Roy D. Frazier
Assistant Examiner—Robert W. Gibson, Jr.
Attorney, Agent, or Firm—Reising, Ethington, Barnard, Perry & Brooks

[57] ABSTRACT

A storage unit of the disclosure includes vertical posts on which beams that connect the posts are adjustably supported at selected heights. Each post has an elongated shape of a T-shaped cross section including an imperforate outer wall, imperforate side walls that extend inwardly from the outer wall in spaced relationship to each other, inner walls that extend from the side walls toward each other in spaced relationship to the outer wall, and flanges which extend inwardly from the inner walls and are connected to each other. Mounting openings are provided in each inner wall of the post along the length thereof for use in securing the beams to the post. Each beam has an elongated shape between the posts and opposite ends which include respective notches. At least one attachment tab is mounted within each beam notch for protection when the beam is not being used and for use in securing the beam to the post by projecting through one of the post mounting openings. Upper and lower ends of the post mounting openings are symmetrical about a horizontal centerline so that the post can be used with either of its ends up. A unitary attachment plate on the end of the beam includes a flat section and a bent section from which the attachment tab is struck. As disclosed, there are two sets of vertically spaced attachment tabs and each set includes a lower support tab and an upper anti-lift tab which are both received within the same mounting opening upon securement of the beam to the post. Inclined surfaces of the post mounting openings are engaged by the support tabs to force the beam end against the post, and wedging surfaces of the support tabs likewise force the beam end against the post.

13 Claims, 5 Drawing Figures

STORAGE UNIT AND POST AND BEAM OF THE UNIT

TECHNICAL FIELD

This invention relates to a storage unit and also relates to a post and a beam of the unit which are cooperable to provide storage at selected vertical heights.

BACKGROUND ART

It is well known to provide storage units having vertical posts on which horizontally extending beams can be adjustably positioned at selected vertical heights. Shelves, planking, or pallets, etc. are supported by the beams to provide storage of articles. Placement of the beams at the required vertical spacing during assembly provides the purchaser with a storage unit which is highly efficient in storing the required articles while minimizing wasted space. Usually shelving, planking, or decking is either supported by the beams which extend between the vertical posts of the unit or shelves are supported by shelf clips mounted on the posts. Pallets are usually supported directly on the beams. Mounting openings spaced along the vertical length of each post receive attachment tabs on either the beams or shelf clips. Proper selection of the post mounting openings utilized locates the beams and/or shelves at the required spacing for maximum storage and minimum wasted space.

Certain storage units include vertical posts whose outer walls have mounting openings formed therein spaced along the length of each post to provide the vertically adjustable beam mounting. When such posts are positioned at the front exposed side of the storage unit, these mounting openings are exposed. Also, some posts include mounting openings having keyhole shapes or other configurations that require mounting of the post with one of its ends up and its other end down in order to provide proper securement of each beam or shelf clip to the post.

The prior art also discloses separate anti-lift clips as well as anti-lift tabs on the beam. Such anti-lift clips or tabs prevent or restrict an upward force from allowing inadvertent detachment of the beam or shelf clips. Separate anti-lift clips require an additional manufacturing operation which results in an additional cost. Anti-lift tabs which are mounted on the shelf or beam are conventionally received within a mounting opening adjacent the mounting opening which receives the attachment tab thereof that provides support of the shelf or beam on the post.

Attachment tabs of storage unit beams have heretofore been exposed on the beam ends without being protected during periods of nonuse. Thus, if the beam is dropped prior to or during assembly of the storage unit, the exposed attachment tabs are not protected.

Storage units as well as posts and beams thereof as generally discussed above are disclosed by U.S. Pat. Nos. 966,022; 1,050,154; 1,577,066; 2,815,130; and 2,909,289.

DISCLOSURE OF THE INVENTION

Objects of the invention are to provide an improved storage unit and to also provide an improved post and an improved beam that are preferably utilized with each other to assemble the storage unit.

In carrying out the above objects and other objects of this invention, a preferred embodiment of the storage unit includes vertical posts which are connected by horizontally extending beams or shelves whose vertical positions can be adjusted as required. Each post has an elongated shape formed from a unitary metal strip such as by a rolling process to define a generally T-shaped cross section. The post includes an imperforate outer wall, imperforate side walls that extend inwardly from the outer wall in spaced relationship to each other, inner walls that extend from the side walls toward each other in spaced relationship to the outer wall, and flanges which extend inwardly from the inner walls and which are connected to each other to reinforce the post. Mounting openings are provided in each inner wall spaced along the length of the post for use in securing the beams. It should be noted that the description herein of the post outer and side walls as being "imperforate" is not intended to mean that there is not a single opening or hole through these walls but is intended to mean that the mounting openings spaced along the length of the post are not located in the outer or side walls. Thus, the outer or side walls may have openings or holes for securing braces that connect the posts such as at the upper or lower post ends or at other locations for other purposes. But, the outer and side walls of the posts which are exposed to view on the posts at the front of the unit do not include any series of mounting openings along the length of the post.

The horizontally extending beams of the preferred embodiment of the storage unit each have ends that define respective notches. An attachment tab mounted on each beam end within the notch thereof is protected when the beam is not secured to the post and is utilized to secure the beam to one of the mounting openings in one post inner wall during use. The beam is preferably formed from a unitary strip of metal by a rolling operation and each end thereof includes an attachment plate from which the attachment tab is struck.

The mounting openings spaced along the length of the post in the inner walls thereof each have upper and lower ends that are symmetrical to each other about a horizontal centerline therebetween so that either end of the post can be used at the upper end to thereby facilitate assembly of the unit. Clip openings on the post flanges are likewise symmetrical about a horizontal centerline thereof and the openings are all spaced relative to each other in a pattern that allows the post inversion. Each end of the mounting opening includes a surface that is inclined toward the adjacent post flange in a direction away from the horizontal centerline between the ends of the opening. The attachment tab on the beam end is received within the opening and engaged with the lower inclined surface thereof so as to force the end of the beam against the post flange. A wedging surface on the tab also cooperates with the inclined post surface to force the beam end against the post.

The beam attachment plate preferably includes a flat section and a bent section which is received within the beam notch. The flat section of the attachment plate engages the post flange in the mounted condition while the bent section engages the side and inner post walls adjacent its engaged flange. Two sets of vertically spaced attachment tabs are formed unitary with the bent section of the attachment plate by either a striking or lancing process in the preferred embodiment. Each set of attachment tabs includes a lower support tab and an upper anti-lift tab that is received within the same mounting opening as the associated support tab to limit upward movement of the beam upon assembly to the post. Each of the tabs includes a U-shaped section that is connected to the attachment plate and received within the interior of the beam, and each tab also includes an end that projects from the U-shaped section thereof into the notch of the beam end. The end of the suport tab includes an upwardly projecting slot, a downwardly projecting outer nose, and an inclined surface that extends between the slot and the nose to facilitate insertion of the attachment tabs within the post mounting openings. One side of the support tab slot includes the wedging surface that cooperates with the inclined surface of the post mounting opening to force the beam end against the post.

Outer sections of the post flanges extend inwardly from the inner walls in spaced relationship to each other, and inner ends of the flanges are secured to each other to provide reinforcement of the post. Mounting openings are also provided in each outer section of the flanges for use in securing shelf clips on which shelves can be supported at vertically adjustable heights.

Cooperable action of the attachment plate support tabs and the wedging surfaces thereof with the inclined surfaces of the associated mounting openings forces the beam end against the post during assembly. The outer nose of each support tab is first inserted within a selected mounting opening and the inclined surface of the support tab then allows downward sliding movement thereof so that the inclined surface of the mounting opening is received within the upwardly projecting slot in engagement with the wedging surface of the slot. The anti-lift tab is moved into the same mounting opening as the associated support tab during the sliding movement of the support tab along its inclined surface into the mounting opening. Sliding movement of the support tab wedging surface along the inclined surface of the mounting opening then provides the forced engagement between the beam end and the post.

A rolling process is preferably utilized to form the beam which includes an outer side in which the end notch is provided and an inner side having an upper groove for receiving an associate shelf or decking, etc. Shelf clips can be secured to the mounting openings in the post flanges to support shelves without the use of the beams. It is also possible to use upper and lower beams to position the posts with respect to each other and shelf clips vertically between the upper and lower beams for supporting shelves. Such upper and lower beams can support shelves or function only to interconnect the posts.

The objects, features, and advantages of the present invention are readily apparent from the following description of the best mode thereof taken in connection with the accompanying drawings.

BEST MODE FOR CARRYING OUT THE INVENTION

Figure 1:
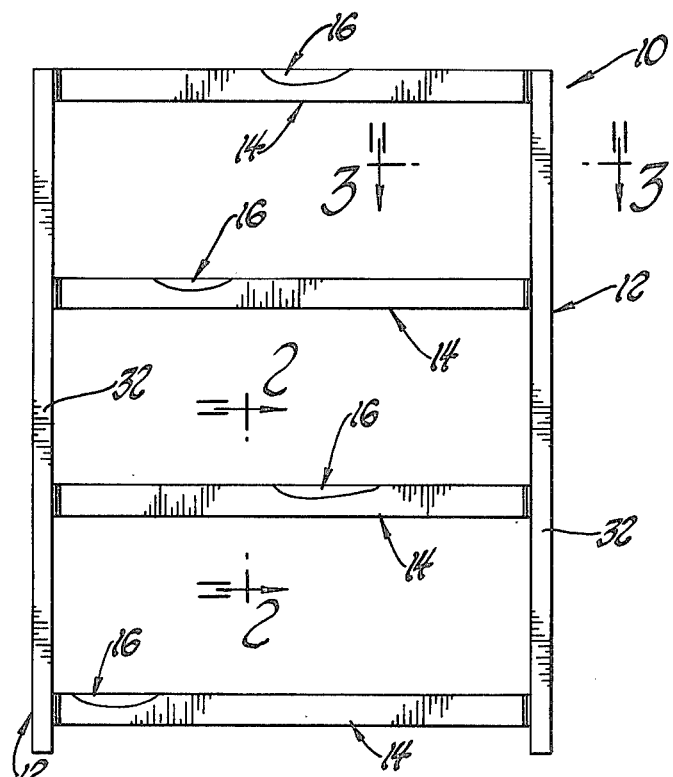
FIG. 1 is a partially broken away front elevation view of a storage unit constructed according to the present invention and including posts and beams thereof.

Referring to FIG. 1 of the drawings, a storage unit constructed according to the present invention is indicated collectively by reference numeral 10 and includes vertically extending posts 12 that are connected by horizontally extending beams 14 on which associated shelves 16 are mounted in vertically spaced relationship to each other. Only front posts 12 and associated front beams 14 are seen in FIG. 1; but, it is to be understood that the storage unit also includes identical rear posts for supporting the shelves or pallets, etc.

Figure 2:
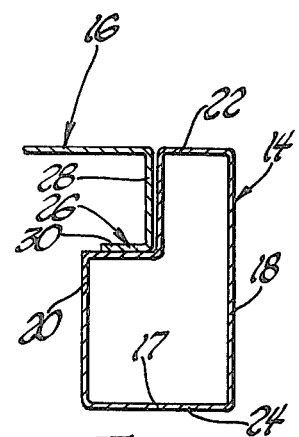
FIG. 2 is a sectional view through one shelf and support beam taken along line 2—2 of FIG. 1.

Each beam 14 has an elongated shape and is preferably made from a unitary metal strip which is formed to the shape shown in FIG. 2 by a suitable rolling process and has a lower welded seam 17. An outer wall or side 18 of the beam is exposed toward the front while an inner wall or side 20 faces toward the rear. Upper and lower walls 22 and 24 of the beam 14 connect the inner and outer sides thereof while the inner side of the beam includes an elongated groove 26 for receiving a pallet or the shelf 16 which is supported thereby at the required height. Shelf 16 includes a flanged edge having a vertical flange 28 that engages the vertical wall of the groove 26 to prevent horizontal shelf movement. A horizontal flange 30 of the shelf is engaged with the horizontal wall of the beam groove 26 so as to vertically locate the shelf. At the rear of the storage unit, the inner and outer sides of the beam face in opposite directions forwardly and rearwardly to the directions shown in FIG. 2 so as to provide support for a rear flanged edge of the shelf within an associated groove along the length of the beam in the same manner.

A more detailed description of the posts 12 will now be given followed by a more detailed description of the beams 14. The manner in which the posts are connected with the ends of the beams to assemble the storage unit will then be described in detail after the post and the beam descriptions.

Figure 3:
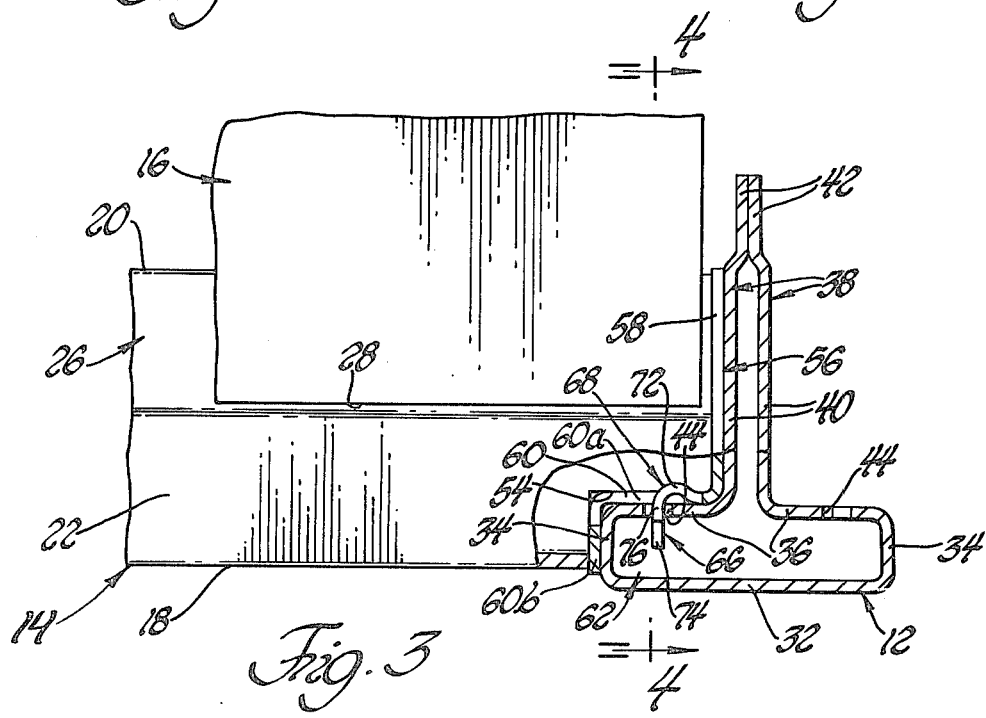
FIG. 3 is a plan view taken in section generally along line 3—3 of FIG. 1 and partially broken away to show the connection between one beam end and the associated vertical post.
Figure 5:
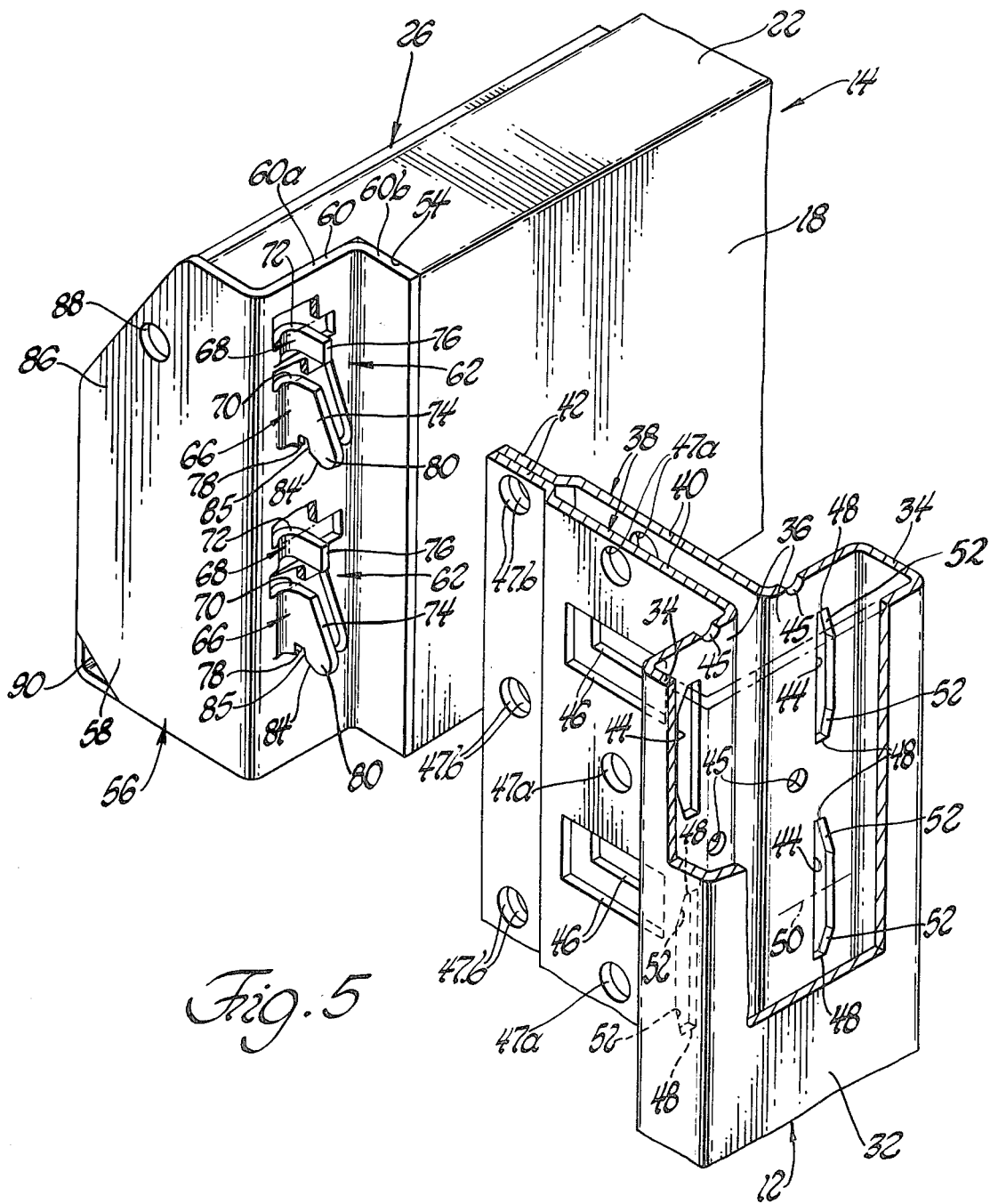
FIG. 5 is a perspective view illustrating the beam end and the post.

Referring to FIGS. 1, 3, and 5, each storage unit post 12 has an elongated shape and is formed from a unitary metal strip by a rolling process to define a generally T-shaped cross section. Post 12 includes an imperforate outer wall 32, imperforate side walls 34, inner walls 36, and flanges 38. Side walls 34 extend inwardly from the opposite lateral edges of the outer wall 32 in spaced and generally parallel relationship to each other. Inner walls 36 extend from the inner edges of the side walls toward each other in spaced and generally parallel relationship to the outer wall 32. Post flanges 38 have outer sections 40 that extend inwardly from the adjacent edges of the inner walls 36 in spaced relationship to each other and also have inner ends 42 that are secured to each other in a suitable manner such as by welding so as to reinforce the post construction.

As best seen in FIG. 5, each post inner wall 36 has a series of mounting openings 44 spaced along the length of the post so as to provide adjustable securement of the beam ends at the required vertical locations for the particular storage function the storage unit is to perform. Inner walls 36 also include openings 45 (FIG. 5) along the length of the post for receiving a suitable stop, such as a sheet metal screw, after assembly of the beam 14 to the post in order to prevent any subsequent upward beam movement. Inner sections 40 of the post flanges 38 each include a series of mounting openings 46 spaced along the length of the post for securing shelves at the required vertical location by shelf clips of the type disclosed in the aforementioned U.S. Pat. No. 2,909,289. Openings 47a in outer flange sections 40 receive bolts for securing cross braces, while holes 47b in the inner flange ends 42 receive bolts for securing sheet metal or any suitable sides or partitions of the storage unit.

It should be noted that the use of the term "imperforate" to describe the outer wall 32 and the side walls 34 does not mean that these walls do not have a single opening or aperture through them but means that the mounting openings 44 and/or 46 for securing beams and/or shelves at vertically adjustable positions are not located on the outer or side walls. Thus, walls 32 and 34 may have a limited number of openings, such as at the upper and lower ends of the post for use in tying the posts together by suitable braces both sideways between laterally adjacent posts and in a forward and rearward direction between adjacent front and back posts. Nevertheless, the front posts 12 do not have any beam or shelf mounting openings along their front or side surfaces at the forward extremity of the post which is exposed to view.

Each mounting opening 44 in the inner walls 36 is seen in FIG. 5 as including upper and lower ends 48 that are symmetrical about a horizontally extending centerline 50 between the ends. Openings 44 have a vertically elongated shape and each end 48 thereof includes an inclined surface 52 that extends toward the adjacent post flange 38 in a direction away from the centerline 50. The symmetrical relationship of the opening ends 48 and the inclined surfaces 52 thereof allows either end of the post to be positioned up and thus facilitates assembly of the storage unit. Shelf clip openings 46 are also symmetrical about a horizontal centerline thereof and are spaced in a pattern that allows the post inversion.

With reference to FIGS. 3 and 5, each beam 14 has opposite ends which include a notch 54 formed in the outer side 18 thereof by a suitable stamping operation so as to extend between the upper and lower beam walls. A unitary attachment plate 56 of the beam end is made from a metallic material such as steel and is secured to the beam end in any suitable manner such as by welds. Attachment plate 56 includes a flat section 58 and a bent section 60 which has legs 60a and 60b received within the notch 54. Bent section 60 of the attachment plate includes vertically spaced attachment tab sets 62 which are lanced from the bent section. It is also possible to strike the tabs from the bent section of the plate with some stock removed therefrom as the tabs are formed. Each attachment tab set 62 includes a lower support tab 66 and an upper anti-lift tab 68. Support and anti-lift tabs 66 and 68 each include respective U-shaped sections 70 and 72 that are received within the interior of the beam and connected to the rest of the attachment plate 56 generally at the bent juncture between the flat section 58 and the bent section leg 60a. Support and anti-lift tabs 66 and 68 also have respective ends 74 and 76 which extend from their associated U-shaped sections and project outwardly into the beam notch 54. Cooperation between the tabs 66 and 68 and the mounting openings 44 in the post 12 secures the beam end to the post in a manner which is more fully hereinafter described. Location of the tabs 66 and 68 within the notch 54 in the beam end protects the tabs when the beam is not being used. Thus the tabs are protected if the beam 14 is dropped on its end plate 56 or on its sides 18, 20, 22, or 24 during assembly or during adjustment of the vertical location at which the beam is secured to the storage unit posts.

Figure 4:
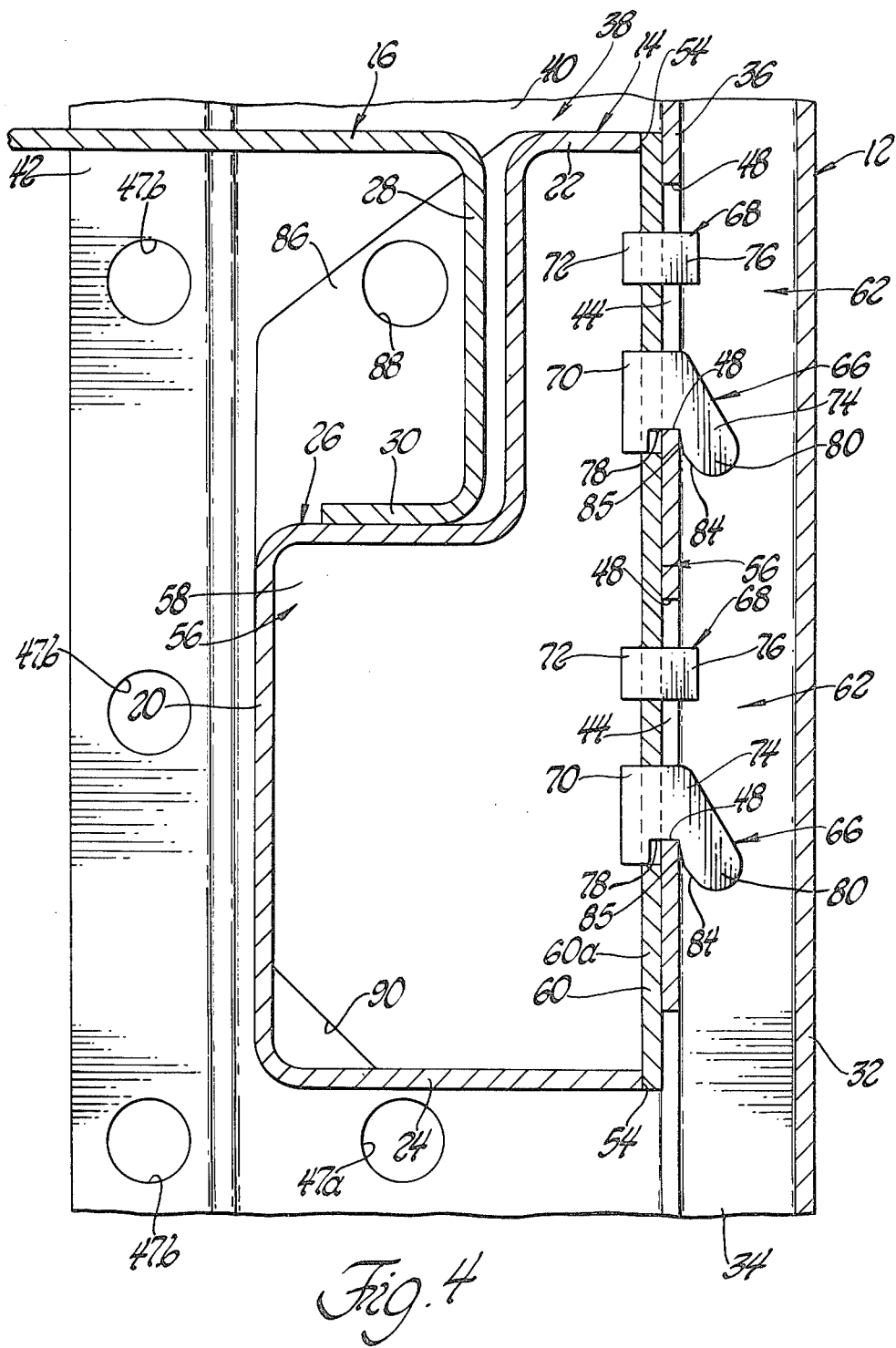
FIG. 4 is an elevation view taken partially in section along line 4—4 of FIG. 3 to further illustrate the connection between the beam end and the associated vertical post.

Assembly of the detached beam 14 to the posts 12 proceeds by movement of the beam end from the position shown in FIG. 5 toward the position shown in FIG. 4. The beam end is located to one side of the post flanges 40 in the assembled position of FIG. 4 and the sets of attachment tabs 62 are secured within adjacent mounting openings 44 in one of the post inner walls 36. Each lower support tab 66 includes an upwardly projecting slot 78 which receives the lower end 48 of the associated post mounting opening and also includes an outer rounded nose 80 which extends downwardly. An inclined surface 84 connects the nose 80 and the upwardly projecting slot 78 at the lower end of a wedging surface 85 of the slot. The wedging surface 85 is inclined slightly with respect to the vertical such that its upper end is located inwardly with respect to its lower end and positioned so as to provide an interference that secures the support tab to the post.

During assembly, the nose 80 of each support tab 66 first is inserted into the associated post mounting opening 48 as the beam is moved toward the post. Continued movement of the beam end toward the post inner wall 36 engages the inclined surface 84 of each support tab with the inclined surface 52 (FIG. 5) at the lower end of the mounting opening. The tabs 66 then slide downwardly and into the mounting openings 44 such that the wedging surface 85 of the upwardly projecting slot 78 in each tab engages the lower inclined surface 52 of the opening. Gravity and any manual or other force applied downwardly to the beam than slides the tab wedging surface 85 downwardly on post inclined surface 52 into a wedged condition that forces the beam end against the post in a securely connected manner. The flat section 58 of the attachment plate is forced against the inner section 40 of the adjacent post flanges while the legs 60a and 60b of the plate bent section are forced against the associated side and inner walls 34 and 36 of the post by the cooperable securement action of the support tab wedging surfaces 85 and the inclined surfaces 52 of the mounting openings. Ends 76 of the anti-lift tabs 68 are aligned with the lower ends of the inclined surfaces 84 on the support tabs 66 and follow the ends 74 of the support tabs into the mounting openings 44. The vertical height from the upper side of each anti-lift tab end 76 to the lower end of the inclined surface 84 on the associated support tab is just slightly less than the total height of the mounting opening 44 in the post so that the tab sets 62 can move through the mounting opening during assembly. Any upward force applied to the beam 14 is prevented from moving the beam upwardly any more than a relatively small extent by the engagement of the anti-lift tab end 76 with the upper end 48 of the mounting opening.

It should be noted in FIG. 4 that the beam attachment plate 56 has an upper inner flange 86 aligned with the end of the beam groove 26 so as to prevent endways movement of the shelf 16 mounted on the beam. A hole 88 in flange 86 is provided to hang the beam when it is painted. Hole 88 is aligned with one set of post flange holes 47a (FIG. 5) upon assembly and bolts may be inserted therethrough to secure the beam to the post. Also, a cutout 90 of the plate flat section 58 allows wash water to drain from the beam as it is washed in preparation for painting.

While the best mode for carrying out the invention has herein been described in detail, those familiar with this art will recognize various alternative designs and embodiments for practicing the invention as defined by the following claims.

What is claimed is:

1. A storage unit comprising: a post of an elongated shape formed from a unitary metal strip to define a generally T-shaped cross section, the post including an imperforate outer wall, imperforate side walls extending inwardly from the outer wall in spaced relationship to each other, inner walls extending from the side walls toward each other in spaced relationship to the outer wall, each inner wall having a series of mounting openings along the length of the post for use in mounting beams, each mounting opening including an inclined surface, and flanges which extend inwardly from the inner walls and which are connected to each other to reinforce the post; and a beam of an elongated shape having at least one end including a notch therein, an attachment tab mounted on said end of the beam within the notch thereof so as to be protected when the beam is not secured to the post and so as to secure the beam to one of the mounting openings in one of the inner walls of the post during use, and said beam attachment tab including a wedging surface that cooperates with the inclined surface of the associated post opening to secure the beam end against the adjacent inner wall and flange of the post.

2. A storage unit as in claim 1 wherein the mounting openings each have upper and lower inclined surfaces such that the post can be used with either end up.

3. A storage unit as in claim 2 wherein the beam includes a unitary attachment plate having a flat section which is engaged against the post flange by the action of the tab and the inclined surface, and the attachment plate also having a bent section received within the notch of the beam end and engaged with the side and inner walls of the post adjacent the engaged post flange.

4. A storage unit comprising: a post of an elongated shape formed from a unitary metal strip to define a generally T-shaped cross section, the post including an imperforate outer wall, imperforate side walls extending inwardly from the outer wall in spaced and parallel relationship to each other, inner walls extending from the side walls toward each other in spaced and parallel relationship to the front wall, flanges having respective outer sections extending inwardly from the inner walls and having respective inner ends connected to each other to reinforce the post, each inner wall having a series of mounting openings along the length of the post, said openings each having upper and lower ends symmetrical about a horizontal centerline therebetween, the upper and lower ends of each opening including respective surfaces that are inclined toward the adjacent post flange in a direction away from the horizontal centerline between the ends of the opening, and a series of mounting openings in the outer section of each flange spaced along the length of the post; and a beam formed from a unitary strip of metal to include a cross section having an inner side including a groove, the beam also having an outer side and at least one end including a notch on the outer side of the beam, an attachment plate mounted on said notched end of the beam and including a flat section and a bent section, the bent section of the plate being received within the notch of the beam end so as to engage one of the post inner walls and its associated side wall upon mounting of the beam on the post, the flat section of the attachment plate being engaged with the associated flange of said one inner wall upon mounting of the beam on the post, the bent section including a lower support tab and an upper anti-lift tab surface projecting outwardly within the notch so as to be protected when the beam is not secured to the post, the support tab being received within one of the mounting openings in said one inner wall of the post so that the support tab is forced toward the associated flange by the inclined surface of the lower end of said one opening, the support tab having a wedging surface that forces the beam end against the adjacent inner wall of the post upon securement of the beam to the post, and the upper anti-lift tab surface being received within the same opening as the support tab to limit upward movement of the beam.

5. A storage unit as in claim 4 wherein the beam includes two vertically spaced sets of support tabs and upper anti-lift tab surfaces respectively received within adjacent openings of the post to secure the beam end to the post.

6. A storage unit post of an elongated shape formed from a unitary metal strip to define a generally T-shaped cross section, the post comprising: an imperforate outer wall, imperforate side walls extending inwardly from the outer wall in spaced relationship to each other, inner walls extending from the side walls toward each other in spaced relationship to the outer wall, each inner wall having a series of mounting openings along the length of the post for use in mounting beams, each mounting opening having upper and lower ends symmetrical about a horizontal centerline therebetween, the upper and lower ends of each mounting opening including respective surfaces that are inclined toward the adjacent post flange in a direction away from the horizontal centerline between the ends of the opening, flanges including outer sections which extend inwardly from the inner walls in a spaced relationship to each other, the outer section of each post flange having a series of mounting openings spaced along the length of the post, and said flanges including inner ends which are connected to each other to reinforce the post.

7. A storage unit beam of an elongated shape having at least one end including a notch therein, a unitary attachment plate mounted on said end of the beam, the attachment plate including a flat section and also including a bent section received within the notch in the end of the beam, the attachment plate additionally including an attachment tab struck from the bent section thereof and projecting outwardly within the notch of the beam so as to be protected when the beam is not being used and so as to secure the beam to a post during use.

8. A beam as in claim 7 wherein the attachment tab comprises a support tab having an outer nose and a wedging surface located inwardly from the outer nose.

9. A storage unit beam of an elongated shaped formed from a unitary strip of metal to include a cross section having an outer side and an inner side including a groove, the beam having at least one end including a notch at the outer side of the beam, an attachment plate mounted on said notched end of the beam and including a flat section and a bent section, said bent section being received within the notch and including two vertically spaced sets of attachment tabs for securing the beam end to a post, and each attachment tab set including a lower support tab and an upper anti-lift tab surface projecting outwardly within the notch so as to be protected when the beam is not being used and so as to cooperatively secure the beam to the post during use.

10. A beam as in claim 9 wherein each tab includes a U-shaped section connected to the attachment plate and received within the interior of the beam, and each tab also including an end that projects outwardly from the U-shaped section thereof into the notch.

11. A beam as in claim 10 wherein the end of each support tab includes an upwardly projecting slot and a downwardly projecting outer nose.

12. A beam as in claim 11 wherein each support tab includes a wedging surface within the upwardly projecting slot thereof.

13. A beam as in claim 12 wherein each support tab also includes an inclined surface extending between the upwardly projecting slot and the downwardly projecting outer nose thereof.

* * * * *